United States Patent Office 3,746,584
Patented July 17, 1973

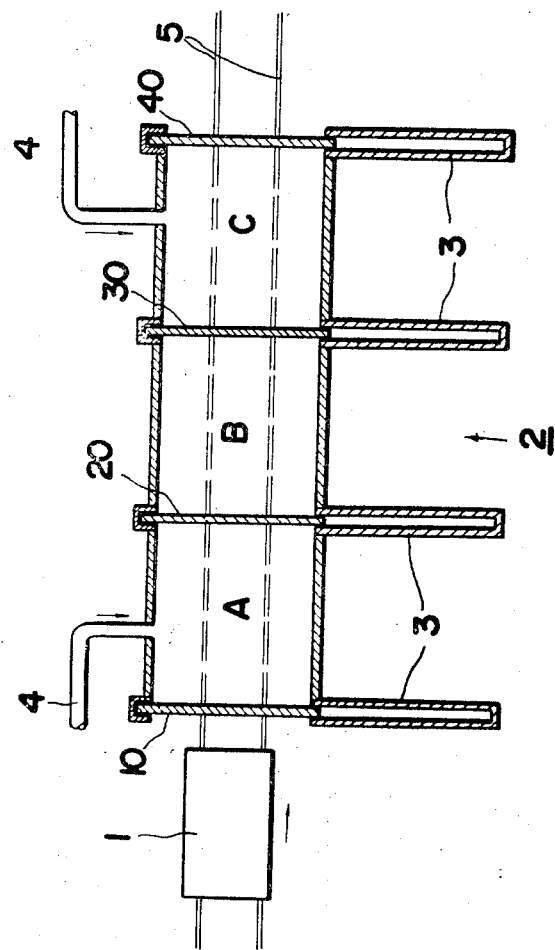

3,746,584
METHOD FOR THE CONTINUOUS VACUUM DECARBONIZATION OF LOW CARBON FERROCHROME
Mutsuo Takeda, Takeji Nakajima, Kenji Takahata, and Toshitsugu Banba, Tokyo, Japan, assignors to Nippon Kokan Kabushiki Kaisha, Tokyo, Japan
Filed Feb. 9, 1971, Ser. No. 113,981
Claims priority, application Japan, Feb. 18, 1970, 45/13,603
Int. Cl. C22c 1/06, 39/14
U.S. Cl. 148—13.1                                           6 Claims

ABSTRACT OF THE DISCLOSURE

Low carbon ferrochrome is manufactured by preheating in an evacuated preheating chamber particles of partially oxidized high carbon ferrochrome bonded together by a bonding agent for removing the bonding agent, decarbonizing the particles at an elevating temperature in an evacuated decarbonizing chamber and cooling the decarbonized particles in an evacuated cooling chamber to a temperature at which oxidation by the atmospheric air does not occur.

BACKGROUND OF THE INVENTION

The present invention relates to a method for the continuous manufacture of low carbon ferrochrome and more particularly to an improved method of decarbonizing high carbon ferrochrome by continuously preheating, decarbonizing and cooling particles of partially oxidized high carbon ferrochrome in a vacuum furnace to obtain low carbon ferrochrome.

There are many methods of preparing low carbon ferrochrome including the molten refining process by the three step method utilizing an electric furnace, and the solid state decarbonizing process utilizing vein-stuff on a siliceous auxiliary agent.

SUMMARY OF THE INVENTION

It is an object of this invention to provide an improved method of solid state decarbonization of high carbon ferrochrome which is superior in many respects when compared with the molten process.

More specific object of this invention is to provide a continuous method of producing a large quantity of low carbon ferrochrome of high quality starting from partially oxidized high carbon ferrochrome.

According to one aspect of this invention there is provided a method of preparing low carbon ferrochrome comprising the step of preheating particles of oxidized high carbon ferrochrome bonded together by means of a bonding agent for removing the same, decarbonizing the particles at an elevated temperature in an evacuated decarbonizing chamber and cooling the decarbonized particles in an evacuated cooling chamber to a temperature at which oxidation by the atmospheric air does not occur.

According to another aspect of this invention there is provided apparatus for manufacturing low carbon ferrochrome from particles of partially oxidized high carbon ferrochrome which are bonded together into lumps by means of a bonding agent, said apparatus comprising an elongated vacuum furnace provided with a plurality of spaced apart sealing valves located on the opposite ends of the furnace and at points intermediate the ends, the valves being movable in the transverse direction of the furnace so as to define a preheating chamber, a decarbonizing chamber and a cooling chamber, means to evacuate the preheating, decarbonizing and cooling chambers, means for heating the preheating and decarbonizing chambers, means for cooling the cooling chamber and means for carrying the particles successively through the preheating, decarbonizing and cooling chambers.

BRIEF DESCRIPTION OF THE DRAWING

In the accompanying drawing a single figure shows a diagrammatic plan view of a continuous vacuum furnace utilized to carry out the novel method.

DESCRIPTION OF THE PREFERRED EMBODIMENT

Referring now to the accompanying drawing a carriage 1 adapted to support the material to be decarbonized is passed along rails 5 through a continuous vacuum furnace 2 comprising a preheating chamber A, a decarbonizing chamber B, and a cooling chamber C. Opposite ends of these chambers are sealed in vacuum tight manner by means of sealing valves 10 and 40 and the vacuum furnace is divided into chambers A, B and C by like sealing valves 20 and 30. Valves 10, 20, 30 and 40 are slidably received in transverse valve casings 3. All compartments are evacuated by a vacuum pump not shown through valves 6 and an exhaust pipe 7. Further, compartments A and C are provided with air inlet pipes 4. The steps of advancinng the carriage carrying the material to be decarbonized are as follows.

(1) The vacuum in chamber C is broken and the valve 40 is opened to move the carriage to the outside of the chamber C.

(2) The valve 40 is closed to restore the chamber (C) to evacuate. Then the value 30 is opened to let the carriage in the chamber (B) into the chamber (C).

(3) The valve 30 is closed and the valve 20 is opened to let the carriage in the chamber (A) into the chamber (B).

(4) The value 20 is closed and the vacuum in the chamber (A) is broken by admitting air thereinto. The valve 10 is opened to admit the carriage into the chamber (A).

(5) The valve 10 is closed to evacuate the chamber (A).

More particularly, particles of partially oxidized high carbon ferrochrome are first preheated to a temperature, preferably above 700° C., in the evacuated preheating chamber (A) which is heated by suitable heating means, not shown. The reason for preheating the ferrochrome before decarbonizing treatment is that, in most cases, particles of partially oxidized high carbon ferrochrome are bonded together into lumps by a suitable bonding agent so that it is necessary to remove the bonding agent before the lumps are advanced into the decarbonizing chamber (B). Since chamber (B) is normally maintained at a high temperature and under a high vacuum, if the material is admitted from outside directly into decarbonizing chamber (B), the bonding agent would be removed from the material and the evaporated bonding agent would contaminate the inside of chamber (B) thus interfering with the desired decarbonizing treatment. According to this invention, the material is preheated in the preheating chamber (A) to remove the bonding agent under vacuum which is objectionable to the desired decarbonizing treatment. After transferring the material into chamber (B), valve 20 is closed, the vacuum in chamber (A) is broken and then valve 10 is opened to receive new partially oxidized high carbon ferrochrome. If desired, before receiving the new material, the preheating chamber (A) may be cleaned by removing the bonding agent deposited on the inside wall of the chamber. In the decarbonizing chamber (B), the decarbonization is performed under vacuum in an advantageous atmosphere at an elevated temperature while the material is maintained in solid state. More particularly, the carbon contained in the high carbon ferrochrome reacts with the oxygen liberated from the oxide to form carbon monoxide gas which may be exhausted by means of a steam ejector, for example. The decarbonization temperature is preferred to be in a range from about 1200° C. to 1400° C.

Then, valve 30 is opened to transfer the decarbonized ferrochrome into cooling chamber (C) which is maintained under vacuum as above described and cooled by any suitable means, not shown. In chamber (C), the ferrochrome is cooled to a temperature ranging from 300 to 400° C. which is lower than the temperature at which the ferrochrome is oxidized by the atmospheric air.

In this manner, according to this invention, the high carbon ferrochrome is decarbonized by three consecutive process steps of preheating, decarbonizing and cooling which are performed in a continuous vacuum furnace, thus greatly reducing the overall treating time when compared with the decarbonizing treatment utilizing a simple decarbonizing furnace. Thus, the operation is easy and the cost of the product is reduced. Preferably, the vacuum in respective chambers is maintained below several millimeters Hg and the vacuum in the cooling chamber below 0.5 mm. Hg.

The following example is given by way of example and not limitation.

EXAMPLE

A powder of partially oxidized high carbon ferrochrome essentially consisting of 55% of chromium, 6% of carbon, 0.5% of silicon, 10% of oxygen and a small quantity of iron was formed into lumps by using a bonding agent of polyvinyl alcohol. The lumps were treated under following conditions.

Temperature:
  Preheating chamber: 700° C.
  Decarbonizing chamber: 1350° C.
  Cooling chamber: 350° C.
Vacuum: 0.5 mm. Hg (ultimate vacuum)
Treating time in respective chambers: 24 hours.
Quantity of the raw material introduced in the furnace: 48 tons.

As a result, 40 tons of No. 2 low carbon ferrochrome as specified in JIS G2303 was obtained having a composition satisfying the specification of JIS.

Composition of the product
  Cr: 65–70%
  C: less than 0.03%
  Si: less than 1.0%

Although, in the above example, No. 2 low carbon ferrochrome was obtained, products of any composition and quantity can be equally obtained by adjusting the composition and quantity of the starting material.

While the invention has been shown and described in terms of a preferred embodiment, it will be clear that many changes and modifications will occur to one skilled in the art without departing from the true spirit and scope of the invention as defined in the appended claims.

What is claimed is:

1. A continuous method of preparing low carbon ferrochrome in a continuous vacuum furnace comprising in succession a preheating chamber, a decarbonizing chamber and a cooling chamber, which method comprises the steps of preheating in said evacuated preheating chamber particles of partially oxidized high carbon ferrochrome bonded together by means of a bonding agent for removing the same, decarbonizing said particles at an elevated temperature in said evacuated decarbonizing chamber and cooling the decarbonized particles in said evacuated cooling chamber to a temperature at which oxidation by the atmospheric air does not occur.

2. The method according to claim 1 wherein said partially oxidized high carbon ferrochrome consists of 55% of chromium, 6% of carbon, 0.5% of silicon, 10% of oxygen and the balance of iron.

3. The method according to claim 1 wherein said bonding agent comprises polyvinyl alcohol.

4. The method according to claim 1 wherein said preheating chamber is maintained at a temperature of at least 700° C., said decarbonizing chamber is maintained at a temperature ranging from 1200 to 1400° C. and said decarbonized particles are cooled to a temperature ranging from 300 to 400° C.

5. The method according to claim 1 wherein said preheating chamber, said decarbonizing chamber and said cooling chamber are maintained at a vacuum of 0.5 mm. Hg.

6. The method according to claim 1 wherein said particles are maintained in said preheating, decarbonizing and cooling chambers at substantially the same time intervals.

References Cited
UNITED STATES PATENTS

| | | | |
|---|---|---|---|
| 2,831,761 | 4/1958 | Cooper | 75—28 |
| 2,541,153 | 2/1951 | Chadwick | 148—13.1 X |
| 3,523,021 | 8/1970 | Khitrik | 75—130.5 X |

L. DEWAYNE RUTLEDGE, Primary Examiner

U.S. Cl. X.R.

75—0.5 BA, 130.5; 148—126